United States Patent [19]

Corominas

[11] Patent Number: 4,622,892
[45] Date of Patent: Nov. 18, 1986

[54] RETRACTILE NEEDLE MEAT PIECES INJECTING MACHINE

[75] Inventor: Narciso L. Corominas, Besalu, Spain

[73] Assignee: Metalquimia, S.A., San Ponc de la Barca, Gerona, Spain

[21] Appl. No.: 731,460

[22] Filed: May 7, 1985

[30] Foreign Application Priority Data

Jul. 5, 1984 [ES] Spain ................................. 532268

[51] Int. Cl.⁴ .............................................. A23B 4/00
[52] U.S. Cl. ......................................... 99/533; 99/535
[58] Field of Search ................. 99/494, 516, 532, 533, 99/535; 17/1 R, 25; 426/281, 58, 332; 27/21, 22 R, 24 R

[56] References Cited

U.S. PATENT DOCUMENTS

| | | | |
|---|---|---|---|
| 3,656,424 | 4/1972 | Evanson | 99/533 X |
| 3,677,169 | 7/1972 | Francis | 99/533 |
| 3,683,789 | 8/1972 | Beasley | 99/533 |
| 3,919,931 | 11/1975 | Liljenberg | 99/533 |

*Primary Examiner*—Timothy F. Simone
*Attorney, Agent, or Firm*—Holman & Stern

[57] ABSTRACT

The injecting head comprises any number of needle rows, being every one of these needles connected through its top to a plunger arranged inside a fixed cylinder, integral with the head frame, being connected both ends of this cylinder to the liquid injection circuit at a constant pressure from 7 to 8 kg/sq.cm., acting the cylinder as a hydraulic accumulator that allows the coming back of the needles when they strike on an obstacle, being provided a connection through a calibrated controlling device between the two pipes which are supplying the cylinder in order to avoid over-pressures and being also intercalated in the circuit a hydraulic means which assures the keeping of an effective pressure in the top end of that cylinder. The machine includes two filtering tanks, alternately used, and a grease decantation system. Each one of the treaders to hold into position the meat piece to be treated, consists of two parts having between them some telescopic tubes with springs allowing the two parts relative bringing near if the thickness of the meat piece to be treated makes it necessary.

4 Claims, 6 Drawing Figures

4,622,892

RETRACTILE NEEDLE MEAT PIECES INJECTING MACHINE

BACKGROUND OF THE INVENTION

This invention patent relates to a retractile needle meat pieces injecting machine, which has a series of improvements in its general structure sustaining the attainment of important advantages with respect to equipment applied to the same purpose now existing in the market.

These machines, as it is well known, are used to condition meat, being usually employed in the pork industry (for instance in the York ham and other similar products manufacturing), in order to enrich the treated meat or improve its presrvation conditions, by means of the addition to it of products such as brine, proteins, phosphates, and similars.

The fact of being provided with retractile needle groups comes from the preferential use of this kind of machine for the treatment of meat products having bone, being in this case necessary take into account that when the needle carrier head is lowered on the product can these needles, finding an obstacle in its penetration through the meat mass, individually go back in appropriate manner. Up to date the most usual solution to this purpose has been to provide the needle carriers with springs allowing its relative movement with respect to the carrying head.

However, given the fact that the injection of these products to the treated meat must be obviously performed in the most homogenous way, without dead spaces or spots throughout the piece subjected to the treatment, it can be understood the need of having heads with a high number of very near needle rows, which periodically are lowered into the meat piece while the latter is in its turn progressively travelling on a transport base in a co-ordinated way with the head action. Now then, since every injection needle must be connected to a supplying pipe for a fluid pressure driven by means of a pump and the needles being mobile, it is necessary to provide a series of flexible pipes to connect the supplying orifice with each needle, which determines, given the required nearness of the needles, that the number of such elements parallel rows (usually in quincunx-arranged) be limited to two. So it can be seen in the embodiment foreseen by the applicant company in its Spanish Pat. No. 399,743.

As an option, the applicant has also proposed in its Spanish Pat. No. 234,805 an alternative to the aforementioned problem, replacing the manifold and the pipes by a long-shaped tank, arranged horizontally and transversly to the head, the ducts of the fluid to be injected being connected to its side ends, being provided in its lower horizontal wall with a series of holes through which pass rigid vertical tubes entering inside the tank and having a helicoidal spring associated with each one, these tubes being the needle carriers.

The use of springs linked to needle carrier tubes inside the tank containing the fluid to be injected has, however, proven be inefficient, making necessary a number of requirements in the materials to be used, maintenance requirements, and also functional ones, which make this solution not advisable.

SUMMARY OF THE INVENTION

The first aim of this invention is, therefore, to obtain a retractile injecting needle carrying head which can accept any number of needle rows with no obstacles or inconvenience.

A further aim of the present invention is to inject pieces of very different thicknesses and specifically pieces having a great height with respect to the conveying floor, without requiring the machine over-sizing as it is necessary up to date in this type of machine with conventional designs.

Finally, it also forms a part of the improvements brought by the proposed machine, to make an improved system for recycling the liquid used in the injection process, in order to better utilize it, with a very efficient grease trapping for the greases which are added to that fluid during the treatment process.

The proposed injection machine consists of a hydraulic circuit for supplying the preserving substance or additive, e.g. brine or other luquid appropriate to the same purpose, and a suction and force pump mechanism, which when the piston moves back draws in the brine (taken as the most usual example) from a reservoir tank and when it moves forwards forces it towards the injecting needle heads, this piston or plunger having an adjustable stroke, which allows it to relatedly change the injection volumes in each action of the head when is lowered onto the piece, but with no change of the pressure which remains constant and advantageously comprised between 7 to 8 kg/sq.cm., being this a principle already patented by the applicant in its invention Spanish Pat. No. 468,071.

This invention is based on the substitution of the assembly made up by an injecting needle, a needle holder bracket, and a pressure support as it is shown in the aforementioned Spanish Pat. No. 399,743, and the use of a hydraulically driven plunger, integral with each one of the needles.

This arrangement permits placing a higher number of needles in the pressing-injecting mobile head of the bridge-shaped carrier structure, itself conventional, connecting the cylinder housing to that plunger, through both ends, to the supplying network of the liquid to be injected. That is, a chamber full of liquid is used as a spring, without the pressure exceeding at any moment a determined value compatible with a motion which is not too violent when the head raises and in spite of having the injection circuit pressure of the order of about 7 to 8 kg/sq. cm.

The injection needle is provided in its whole length with a number of orifices distributed in a spiral arrangement and having a very reduced diameter, of the order of tenths of millimeter, through which the preserving liquid is ejected when it is injected under the aforementioned pressure values and practically sprayed, having in its top side near the plunger a port hole through which the liquid enters inside the needle. In this way the cylinder acts as a hydraulic spring or, even better, as a hydraulic accumulator, and in the event that one of the needles is stopped in its downstroke by knocking against a gristle or a bone in the meat piece, the internal pressure of such liquid does not increase as the head lowers as it would happen with any spring, but it does not exceed in any case a previously determined pressure value, and thus, in this way, when the head raises again the needle is not violently tripped but is smoothly unpegged and returns to its initial position like the other needles in the head.

The method to attain that the needle acts as a retractile one with no increase in the reactive pressure is accomplished by means of a by-pass ducting, which is connected to and interrelates with the fluid supplying duct provided in the cylinder end on which the needle is fitted, i.e. the lower one, with the higher end, the duct having a control means intercalated and calibrated to control the transfer flow rate. A hydraulic means is used which acts in a co-ordinated way on the circuit and which determines the production of a complementary pressure on the top of the cylinder, so that the needle position can be maintained in the intermittence phases, in each cycle, when the injection of liquid under pressure is stopped.

The injecting liquid in excess when the meat is injected is collected by means of a duct located at a level lower than than the one of the meat pieces and conveyed to a side tank, together with the substances detached from these pieces. In this tank there has been provided a decantation system for the greases, which due to their lower density go up and float; when the level of the greases increases its thickness and the greases reach the overflow they are conveyed to a collecting tank, with a form similar to a drawer, which can be easily removed when it is full in order to be emptied. The injecting liquid, being heavier than the grease, is drawn out through a trap pipe, which separates the grease, and is transferred to two further tanks located one at each side of the re-cycling station, being the liquid conveyed to one tank or to the other by means of a piping which is manually moved by the operator and placed alternately on each tank, so that while one of them is being used the other can be cleaned and vice versa. Both tanks are provided with a medium mesh pre-filter and a second filter with a high density mesh to remove as far as it is possible the impurities, in order to avoid clogging of the very small holes that the needles have throughout thier section when the re-cycled liquid is injected again.

The injecting head instead of having like the conventional ones a single treading block for the meat piece holding in the injection phases, provided with a series of holes through which the needles pass, it consists of two bodies or plates superimposed and with a gap between them.

The lower block, which constitutes the treader that retains the meat piece, consists of, seen in an elevation view, a protruding prismatic central body that in both ends decreases its height an it thickness in a parallel way to the base and in the same amount in both ends. In the central portion is where the needle passing through holes are located, these holes being of a larger diameter than the needles, except in the lower portion in which the needles pass through very fitted, which is used as a guide for them in their alternative up and down movements. This arrangement has the purpose of avoiding foam making up in the injecting fluid exceeding over the treader body and has been claimed in the applicant's Pat. No. 532,269. The higher body or plate has a shape adaptable to the lower plate shape so that it can be exactly fitted to it, specially in its central portion, and, therefore, it is provided with the same arrangement of holes for the needles, which correspond exactly in the coaxial direction to each other and having arranged between them some tubular parts which are housed in the hole mouthpiece of the treading body and can telescopically move through the second plate as guides and thus allowing the approximation of the two plates that constitute this treader. In the portions of these plates nearest to the ends there are two solid vertical shafts secured to lower body, or treading plate, around which and entouring the are two spiral springs, while the higher plate has, in coaxial position, two tubes closed in their tops housing the shaft and spiral coaxial spring ends, tending this arrangement to maintain both plates apart at a distance given by the strength of these springs, but because of the elasticity of the springs the two plates may arrive to touch each other when a related presure is exerted as a consequence of the treader knocking against a piece of high thickness. In addition, the lower plate has fitted two hollow bars with long spiral springs which go up to the machine up and down mobile bridge, being fitted those bars with a smooth adjustment inside two other bars integral with the head so that those tubes work in a telescopic way and have a tendency, when the head comes down, to maintain the meat compact mass hold against the machine flat frame in its support and working run.

DETAILED DESCRIPTION OF THE INVENTION

Figure 1:
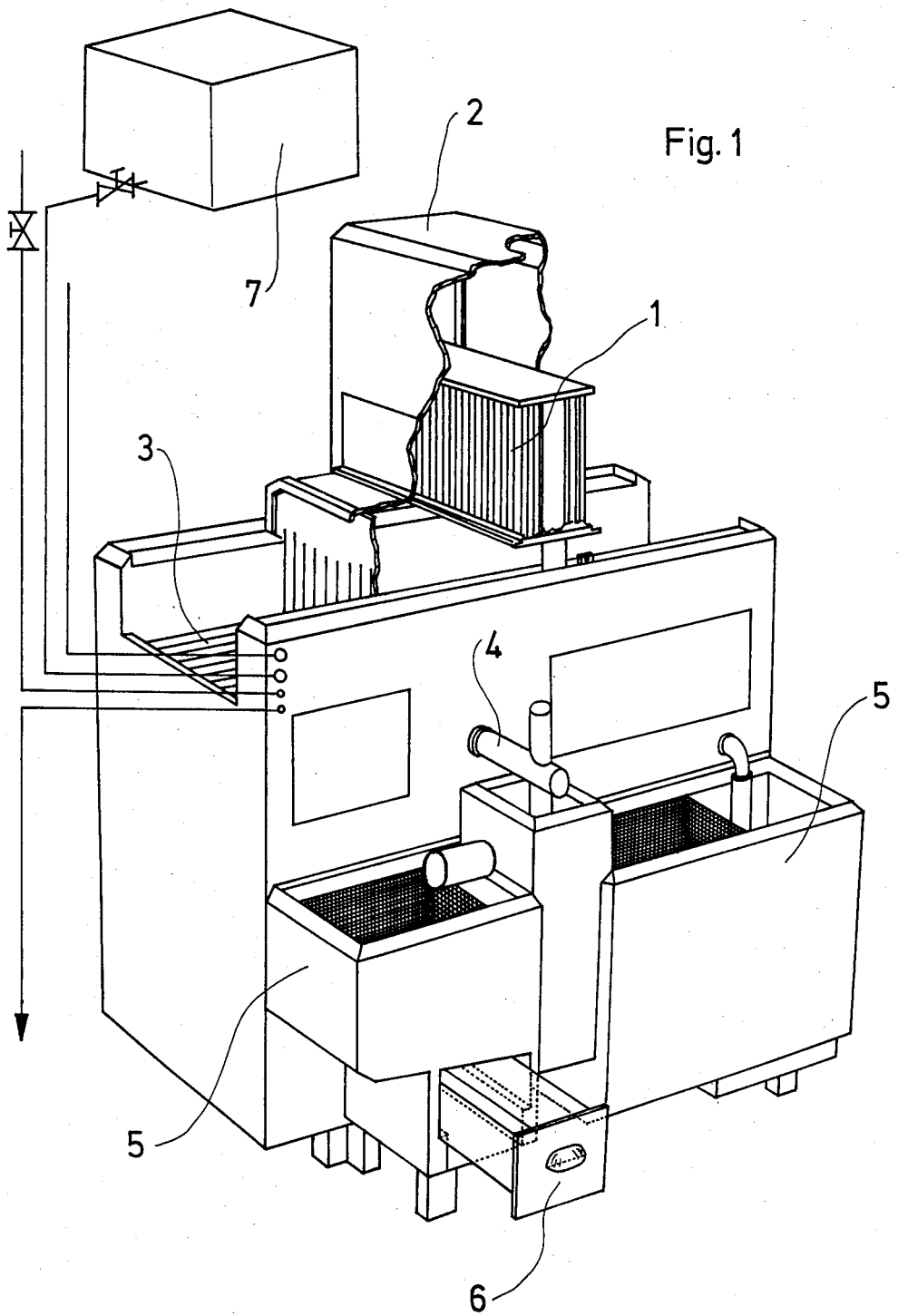
FIG. 1 is a perspective view.

To a better understanding of what has been explained until now, five drawing sheets are attached to this specification, where a preferred embodiment of this machine is illustrated by example, not limitative, way according to the following figures:

In the first sheet and FIG. 1 there is seen a perspective view of the whole machine, from which drawing it can be outlined: the mobile head -1-, in a schematic view (in other drawings it is seen with more detail) with its protection casing -2-, the meat piece support mobile floor -3-, the excedent liquid collecting piping -4-, the filtering tanks -5-, the grease collector tank-drawer -6- partially drawn out, and the higher tank -7- containing the brine or other preserving substance.

Figure 2:
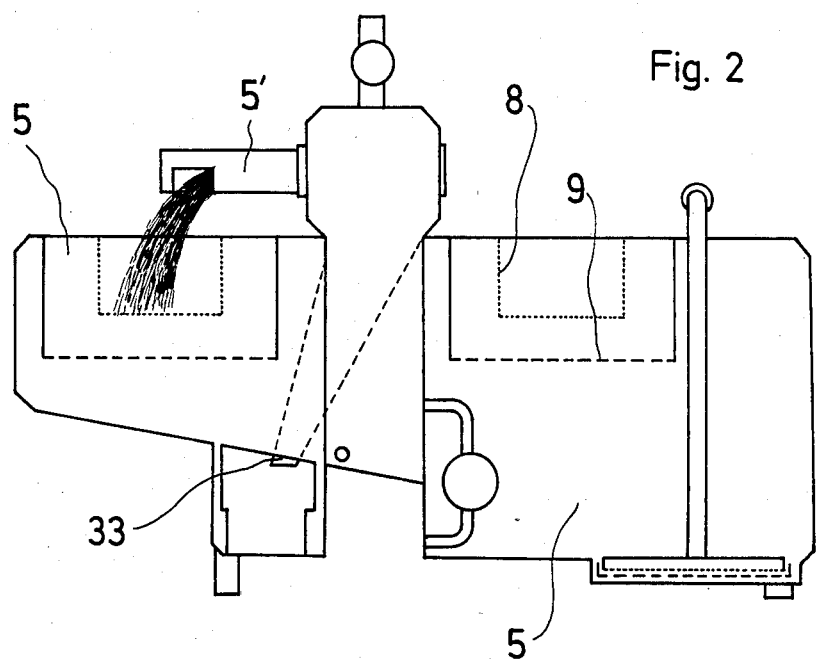
FIG. 2 is an end elevational view.
Figure 3:
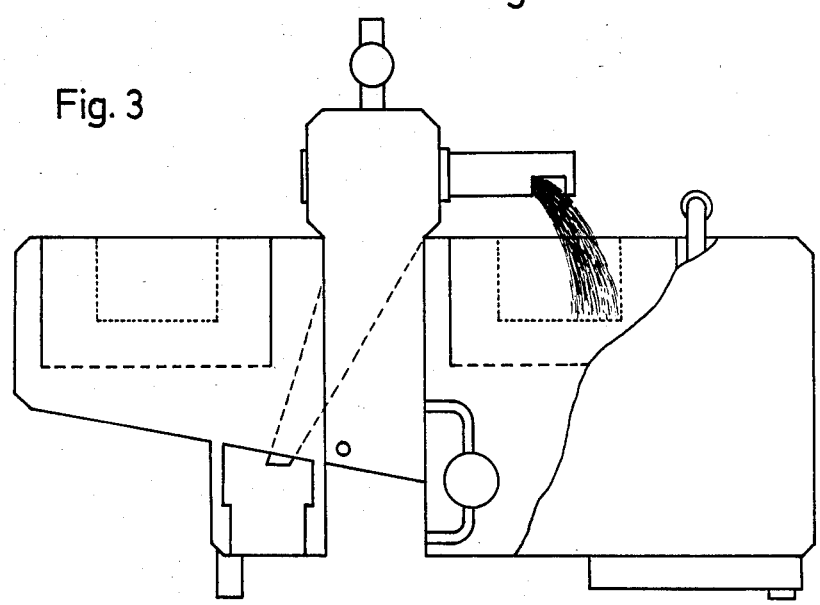
FIG. 3 is an end elevational view from the rear of FIG. 2.

The second sheet shows in its schematic FIGS. 2 and 3, as a machine partial portion, the conveying of the surplus liquids collected from the working frame to the filtering tanks -5-, being the liquids discharged in the left hand tank in FIG. 2 and in the right hand tank in FIG. 3, being this obtained by moving the pipe -5'-, which is performed by hand as above mentioned, so that while the pre-filter -8- medium mesh and the filter -9- more compact one are cleaned, the opposite side tank filters are working. It can be seen, also schematically, the grease drainage -33- in the collecting drawer, not shown in these these FIGS. 2 and 3.

Figure 4:
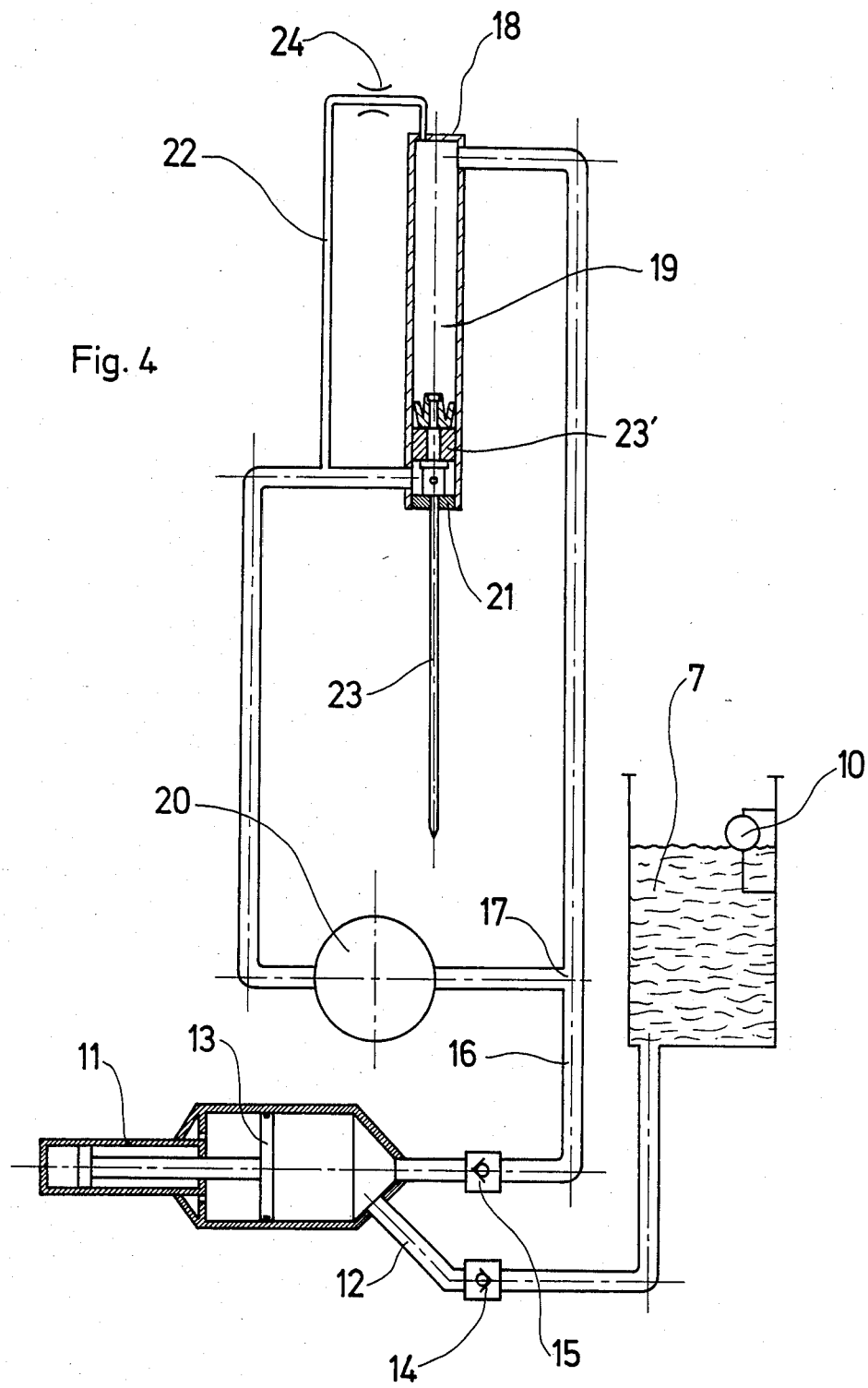
FIG. 4 is a schematic view of an injecting needle unit.

The third sheet only includes the FIG. 4 in which it can be seen only one injecting needle unit, the circuit of which will be understood to be common to all others. It consists of the already mentioned reservoir tank -7-, with its float valve -10-, being the liquid sucked from this tank through the pipe -12- by a piston pump -11-, and when the piston -13- reverses it stroke it shuts off the check valve -14- and opens the valve -15- injecting that liquid through the piping -16-, which by bifurcating at the tee -17-, distributes a part to the cylinder head -18-, and the other part to a hydraulic means -20-, which making it pass through it, sends it to the lower portion -21- of the same cylinder, and through a by-pass -22- to the cylinder top portion -18- too.

During normal operation, the needle -23-, integral with the plunger -23'- by its head, comes down together with the cylinder -19-, runs through the meat and the liquid injection is performed since this needle always remains in its stroke lower limit inside the cylinder -19-, because the difference of sections and, therefore, of pressure in the higher and the lower parts of the plunger to which the needle is fitted, but when the needle finds a gristle or a bone and its coming down forced by the head is stopped, the needle comes back inside the cylinder -19-, without any difficulty due to the aforementioned by-pass -22-, and with no overpressure. As far as the pressure in the cylinder top side is concerned, it is maintained at any moment, even in the suction phases of the suction and force cycle (and injection stopping), by means of the aforementioned hydraulic means -20- operation. It must be also mentioned that in the higher portion od the by-pass duct -22- a calibrated controlling device -24- for the transfer flow rate is placed.

Figure 5:
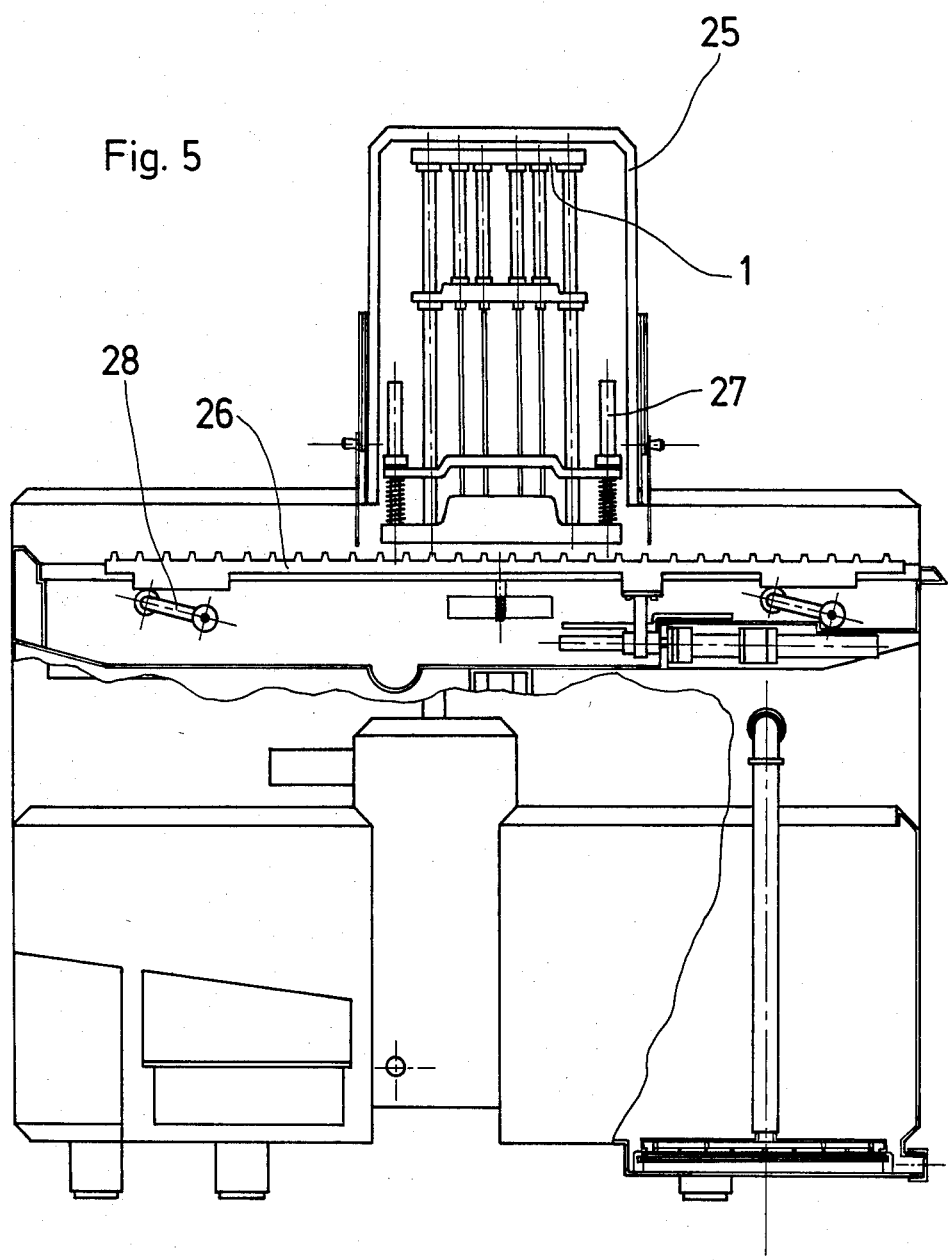
FIG. 5 is a front, partically cut away, view of the apparatus of FIG. 1.

The fourth includes the FIG. 5 showing a cutaway section of the machine in which it can be seen the bridge -25- supporting the head -1- and the mobile table -26- which acts as support and travel device for the meat pieces when they are released from the treader -27- holding action, this travel movement being performed because of the lever link -28- reciprocating movement, driven by means of a cyclic system also well known.

Figure 6:
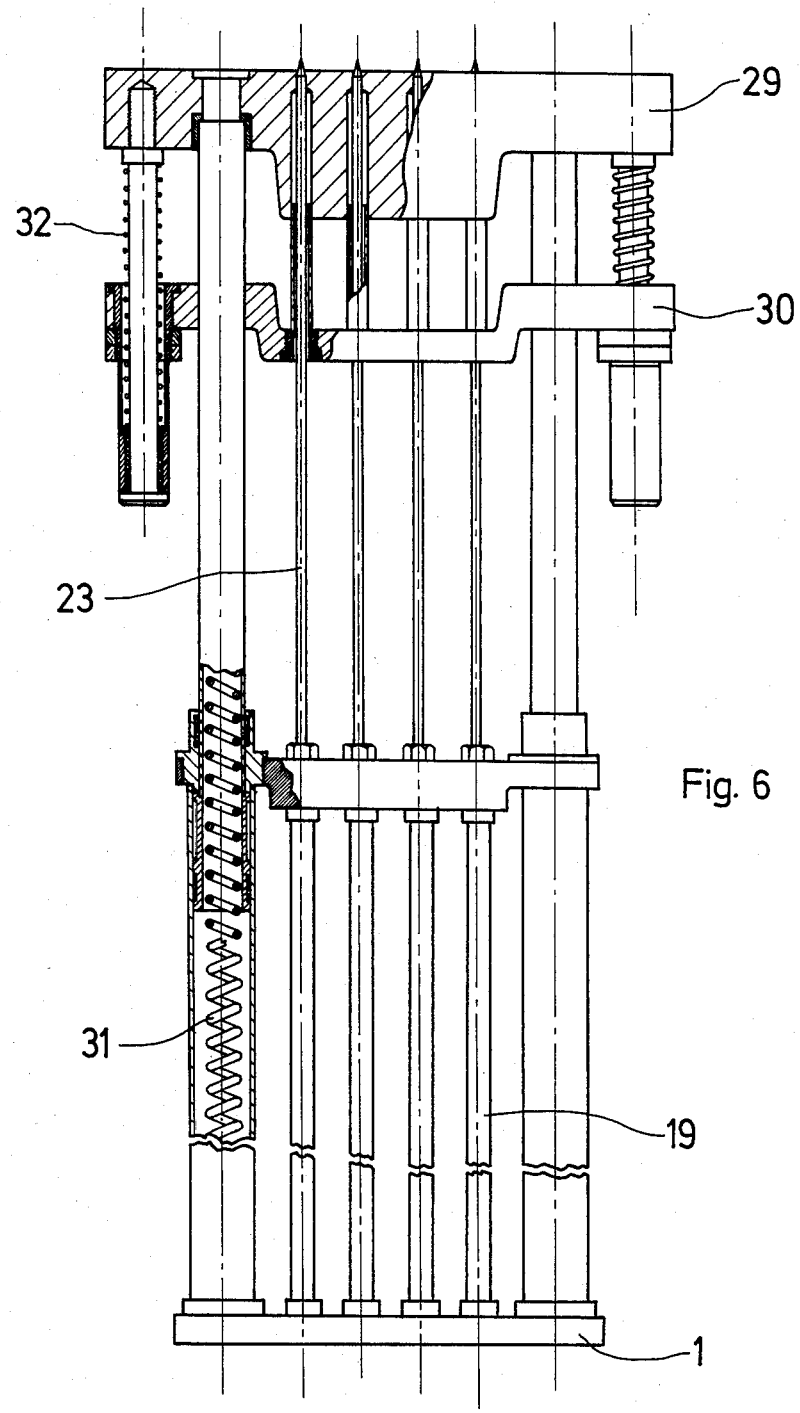
FIG. 6 is a front view, partially broken away, of the treader according to the present invention.

Finally, the fifth sheet, illustrated with the FIG. 6, makes clear the making up of the aforementioned treader, which consists of two plates, the lower plate -29- and the higher plate -30-, with which it is attained the operation of the treader with a possible increase in the meat pieces height (if necessary), which receive in addition to the normal pressure of the springs -31-, the additional pressure of the springs -32-, located in the lower treading plate ends, all this with no alteration in head dimensions.

Indeed, when the head -1- comes down, it forces all needles -23- to come down also, and since the treaders cannot come down, being prevented from doing it by the meat pieces, then the mentioned needles go on downwards and thrust into the meat taking place the liquid injection, with the highest pieces of meat more strongly held since in this case the springs are more compressed and thereby exerting a stronger pressure.

Thus described the novelties making up the Invention Patent applied for, as an improvement to this meat injecting machine and also to the operation of it, in a form clear enough to be perfectly understood and put into practice by an expert in this matter, it will be understood that it is not limited thereto, byt may be otherwise embodied within the scope of the following claims.

I claim:

1. An apparatus for injecting meat pieces, comprising:
   a plurality of injecting needles;
   a means for supplying a fluid into said injecting needles, said fluid being injected by said injecting needles into meat being processed;
   a means for supporting said plurality of injecting needles;
   said means for supporting including a cylinder guiding a plunger, said plunger supporting one of said plurality of injecting needles;
   said plunger having a bore therethrough for permitting passage of fluid from said cylinder into said injecting needle;
   a means for moving said means for supporting in a reciprocal motion;
   a fluid supply port disposed in said cylinder adjacent a position which represents a furthermost extent of travel of said plunger;
   a second port disposed in said cylinder adjacent a position representing a furthermost retraction of said needle into said cylinder;
   said first port being in fluid communication with said needle when said needle is at its furthermost extent from said cylinder;
   said needle being biased by said plunger toward its furthermost extent from said cylinder;
   said needle being forced into said cylinder during a downstroke of said means for supporting when said needle encounters a sufficiently hard portion of the meat;
   a means for limiting internal pressure of fluid within said cylinder below a predetermined value, said predetermined value being sufficiently low to avoid violent motion of said needle from said cylinder when said means for supporting moves toward an upper position.

2. An apparatus as claimed in claim 1, further comprising a means for bypassing fluid from said cylinder above said plunger;
   said means for bypassing including a communication line linking a supply conduit to said second port with a region of said cylinder disposed on an opposite side of said plunger from said needle;
   said means for bypassing including a means for limiting fluid flow through said means for bypassing, so as to control fluid flow therethrough; and
   a means for maintaining pressure in said cylinder when pressure from said means for supplying fluid to said cylinder becomes interrupted.

3. An apparatus as claimed in claim 1, further comprising a means for conveying away surplus injection liquid together with other substances from the meat to a side tank;
   said side tank including a grease decantation system for separating said injection fluid from grease;
   and means for recycling said fluid after being collected;
   said means for separating said fluid from said grease including at least one filter.

4. An apparatus as claimed in claim 1, further comprising a plurality of treading means;
   said treading means having a central zone and two side extensions, said central zone having a series of through ducts having a diameter larger than a diameter of each of said needles;
   said central zone having a bottom, said bottom having a restricted bore therethrough to aid in guiding said needle during movement therethrough;
   and a plate having a generally concave lower side, and having a plurality of bores therethrough which correspond in position, and being disposed coaxially with a plurality of duct mouthpieces of said bottom of said central zone;
   a plurality of tubular elements being disposed respectively for connecting said plurality of holes in said plate with said duct mouthpieces;
   said tubular elements being telescopically movable through said plate, said plate having two telescopically mounted shafts provided with springs which urge said plate apart from said bottom of said central zone;

said treading means having a top plate supporting two bars, said two bars housing said telescopic tubes, said bars being connected by springs so as to maintain said treading means in a lower position relative to a treatment plane.

* * * * *